(12) United States Patent
Imamura

(10) Patent No.: US 11,601,639 B2
(45) Date of Patent: Mar. 7, 2023

(54) INFORMATION PROCESSING APPARATUS AND IMAGE DISPLAY METHOD

(71) Applicant: Sony Interactive Entertainment Inc., Tokyo (JP)

(72) Inventor: Takashi Imamura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/355,314

(22) Filed: Jun. 23, 2021

(65) Prior Publication Data
US 2022/0014729 A1 Jan. 13, 2022

(30) Foreign Application Priority Data
Jul. 9, 2020 (JP) .............................. JP2020-118637

(51) Int. Cl.
| | |
|---|---|
| *H04N 13/383* | (2018.01) |
| *G06F 3/16* | (2006.01) |
| *H04N 13/344* | (2018.01) |
| *G06F 3/01* | (2006.01) |
| *H04N 13/204* | (2018.01) |

(52) U.S. Cl.
CPC ........... *H04N 13/383* (2018.05); *G06F 3/012* (2013.01); *G06F 3/165* (2013.01); *H04N 13/344* (2018.05); *H04N 13/204* (2018.05)

(58) Field of Classification Search
CPC .. H04N 13/383; H04N 13/344; H04N 13/204; G06F 3/012; G06F 3/165; G06F 1/163; G06F 3/013; G06F 3/04815; G06F 3/011; G02B 2027/0134; G02B 27/0093; G02B 27/017; G02B 30/20
See application file for complete search history.

(56) References Cited

U.S. PATENT DOCUMENTS

2018/0315248 A1* 11/2018 Bastov ................ G06F 3/04815

FOREIGN PATENT DOCUMENTS

WO 2019038885 A1 2/2019

* cited by examiner

*Primary Examiner* — Oschta I Montoya
(74) *Attorney, Agent, or Firm* — Matthew B. Dernier, Esq.

(57) ABSTRACT

Provided is an information processing apparatus for causing a plurality of virtual screens to display images, the information processing apparatus including a user information acquisition section configured to acquire user information indicating at least one of a user preference and a user attribute, an image determination section configured to determine images to be displayed on the respective virtual screens according to the user information, and a display processing section configured to cause the virtual screens to display the respective images determined by the image determination section.

8 Claims, 6 Drawing Sheets

INFORMATION PROCESSING APPARATUS AND IMAGE DISPLAY METHOD

CROSS REFERENCE TO RELATED APPLICATION

This application claims the benefit of Japanese Priority Patent Application JP 2020-118637 filed Jul. 9, 2020, the entire contents of which are incorporated herein by reference.

BACKGROUND

The present disclosure relates to a technique for causing virtual screens set in a virtual space to display images.

With a head-mounted display (HMD) worn on a user's head, the HMD allows the user to view a virtual reality (VR) video world. The HMD provides a VR image to the entire field of view of the user, thereby immersing the user in the VR video world. PCT Patent Publication No. WO2019/38885 discloses a user interface for allowing the user to select, on an HMD, any pieces of video of a live event being captured by a plurality of cameras.

SUMMARY

A multi-screen technique realizes multifaceted expression by displaying different images on a plurality of screens. The inventor of the present disclosure focused on the possibility of creating an image space that enhances a sense of immersion by setting a plurality of virtual screens in a virtual space and causing these virtual screens to display different images.

In view of the foregoing, it is desirable to provide a technique for causing a plurality of virtual screens to display images.

A mode of the present disclosure is an information processing apparatus for causing a plurality of virtual screens to display images. The information processing apparatus includes a user information acquisition section configured to acquire user information indicating at least one of a user preference and a user attribute; an image determination section configured to determine images to be displayed on the respective virtual screens according to the user information; and a display processing section configured to cause the virtual screens to display the respective images determined by the image determination section.

Another mode of the present disclosure is an image display method for causing a plurality of virtual screens to display images. The image display method includes acquiring user information indicating at least one of a user preference and a user attribute; determining images to be displayed on the respective virtual screens according to the user information; and causing the virtual screens to display the respective determined images.

Any combinations of the constituent components described above and the expressions of the present disclosure that are converted between a method, an apparatus, a system, a computer program, a recording medium in which the computer program is readably recorded, data structure, and the like are also effective as modes of the present disclosure.

According to the present disclosure, a technique for causing a plurality of virtual screens to display images is provided.

DETAILED DESCRIPTION OF THE PREFERRED EMBODIMENT

Figure 1:
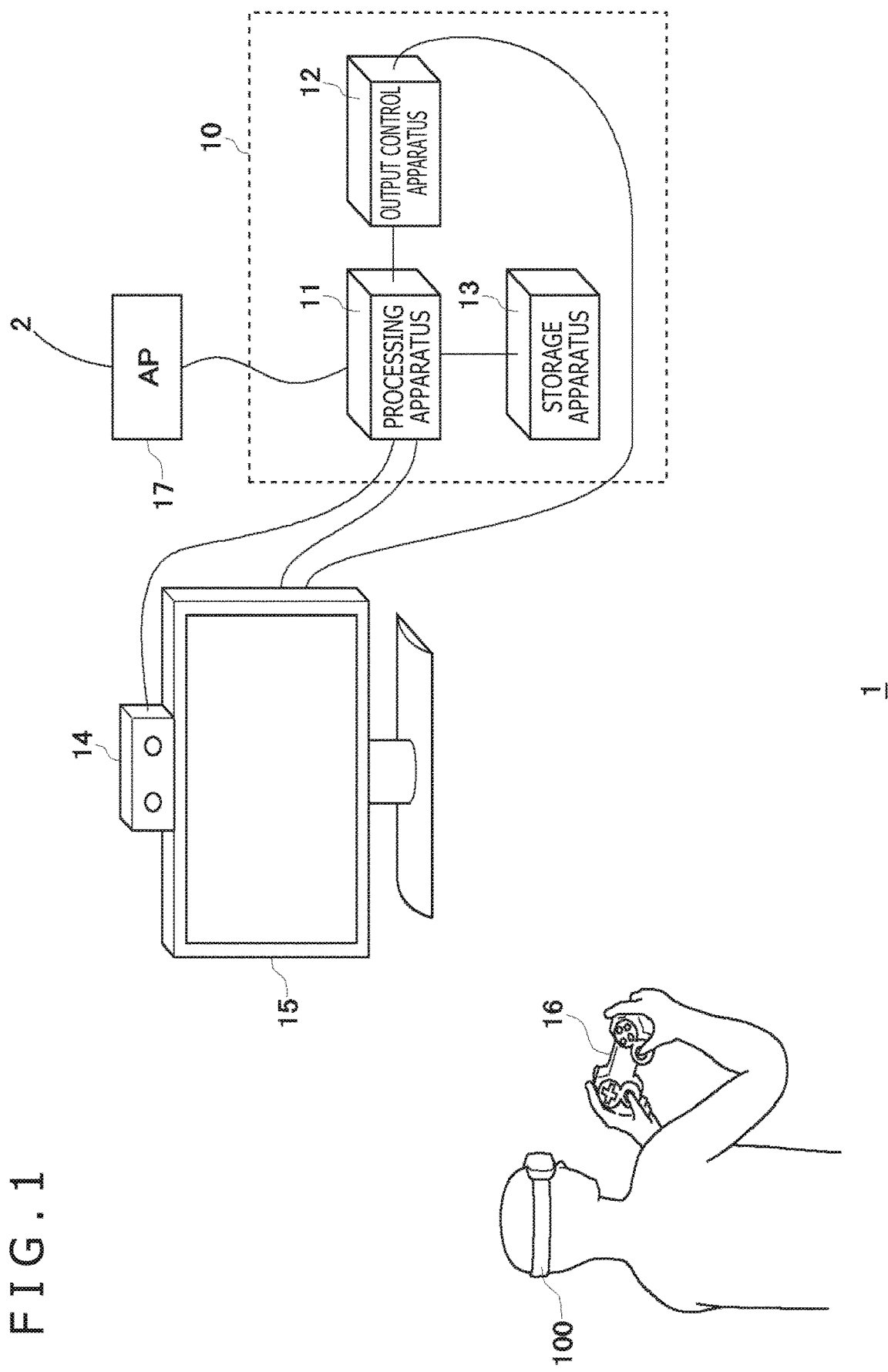
FIG. 1 is a diagram illustrating an example of a configuration of an information processing system.

FIG. 1 illustrates an example of a configuration of an information processing system 1 according to the present embodiment. The information processing system 1 includes an information processing apparatus 10, an HMD 100, an input apparatus 16, an imaging apparatus 14, and an output apparatus 15. The input apparatus 16 is operated by a user with the user's fingers. The imaging apparatus 14 captures the user wearing the HMD 100. The output apparatus 15 displays an image. The output apparatus 15 may be a television. The information processing apparatus 10 is connected to an external network 2, such as the Internet, via an access point (AP) 17. The AP 17 has functions of a wireless access point and a router. The information processing apparatus 10 may be connected to the AP 17 through a cable or a known wireless communication protocol. The information processing apparatus 10 may be connected to, for example, an external content server via the network 2.

With the HMD 100 worn on the user's head, the HMD 100 allows the user to view a VR video world. The information processing apparatus 10 has a head tracking function. With this head tracking function, the information processing apparatus 10 can update a field-of-view image displayed on the HMD 100 in response to the user's head movement, thereby enhancing the user's sense of immersion in the VR video world.

The information processing apparatus 10 includes a processing apparatus 11, an output control apparatus 12, and a storage apparatus 13. The processing apparatus 11 is a terminal apparatus that receives operation information input into the input apparatus 16 by the user and executes a content video display application. The processing apparatus 11 and the input apparatus 16 may be connected to each other through a cable or a known wireless communication protocol. The output control apparatus 12 is a processing unit that supplies the HMD 100 with image data output from the processing apparatus 11. The output control apparatus 12 and the HMD 100 may be connected to each other through a cable or a known wireless communication protocol.

The imaging apparatus 14 is a stereo camera. The imaging apparatus 14 captures the user wearing the HMD 100, at predetermined intervals, and supplies the captured image to the processing apparatus 11. As described later, the HMD 100 is provided with markers (tracking light-emitting diodes (LEDs)) for tracking the user's head, and the processing apparatus 11 detects the movement of the HMD 100 on the basis of the positions of the markers included in the captured image. The HMD 100 includes a posture sensor (including an acceleration sensor and a gyro sensor). The processing apparatus 11 acquires sensor data detected by the posture sensor from the HMD 100 to perform highly accurate head tracking processing together with the use of the captured image of the markers. Among various tracking processing methods that have been proposed in the past, the processing apparatus 11 may employ any of the methods as long as the processing apparatus 11 can detect the movement of the HMD 100. For example, the HMD 100 may include a camera, and the processing apparatus 11 may perform head tracking by performing simultaneous localization and mapping (SLAM) processing on the basis of an image captured by the camera.

Since the user wearing the HMD 100 views an image displayed on the HMD 100, the output apparatus 15 is not necessarily required for the user wearing the HMD 100. However, providing the output apparatus 15 allows another user who is not wearing the HMD 100 to view an image displayed on the output apparatus 15. The output control apparatus 12 or the processing apparatus 11 may cause the output apparatus 15 to display the same image as a field-of-view image being viewed by the user wearing the HMD 100 or may cause the output apparatus 15 to display an image different from the field-of-view image.

The HMD 100 is a display apparatus that displays images on display panels located in front of the eyes of the user wearing the HMD 100 on the head. Specifically, the HMD 100 separately displays an image for the left eye on a left-eye display panel and an image for the right eye on a right-eye display panel. These images constitute parallax images viewed from the right and left viewpoints, realizing a stereoscopic vision. Since the user views the display panels through optical lenses, the information processing apparatus 10 supplies the HMD 100 with parallax image data in which optical distortion caused by the lenses has been corrected. The processing for correcting the optical distortion may be performed by either the processing apparatus 11 or the output control apparatus 12.

The function of the output control apparatus 12 may be incorporated into the processing apparatus 11. In other words, the processing unit of the information processing apparatus 10 may include the processing apparatus 11 or may include the processing apparatus 11 and the output control apparatus 12. In the following description, a function of providing a VR image to the HMD 100 will collectively be described as the function of the information processing apparatus 10.

The information processing apparatus 10 detects the position coordinates and posture of the user's head (actually, the HMD 100) by performing the user head tracking processing. The position coordinates of the HMD 100 are position coordinates in a three-dimensional space having an origin at a reference position. The reference position may indicate the position coordinates (latitude and longitude) when the HMD 100 is turned on. The posture of the HMD 100 is represented by inclination in a three-axis direction relative to a reference posture in the three-dimensional space. The reference posture refers to a posture as of the time when the user's gaze direction is horizontal. The reference posture may be set when the HMD 100 is turned on.

The information processing apparatus 10 can detect the position coordinates and posture of the HMD 100 solely from the sensor data detected by the posture sensor of the HMD 100. Moreover, the information processing apparatus 10 can detect the position coordinates and posture of the HMD 100 with high accuracy by analyzing an image of the markers (tracking LEDs) of the HMD 100 captured by the imaging apparatus 14.

Figure 2:
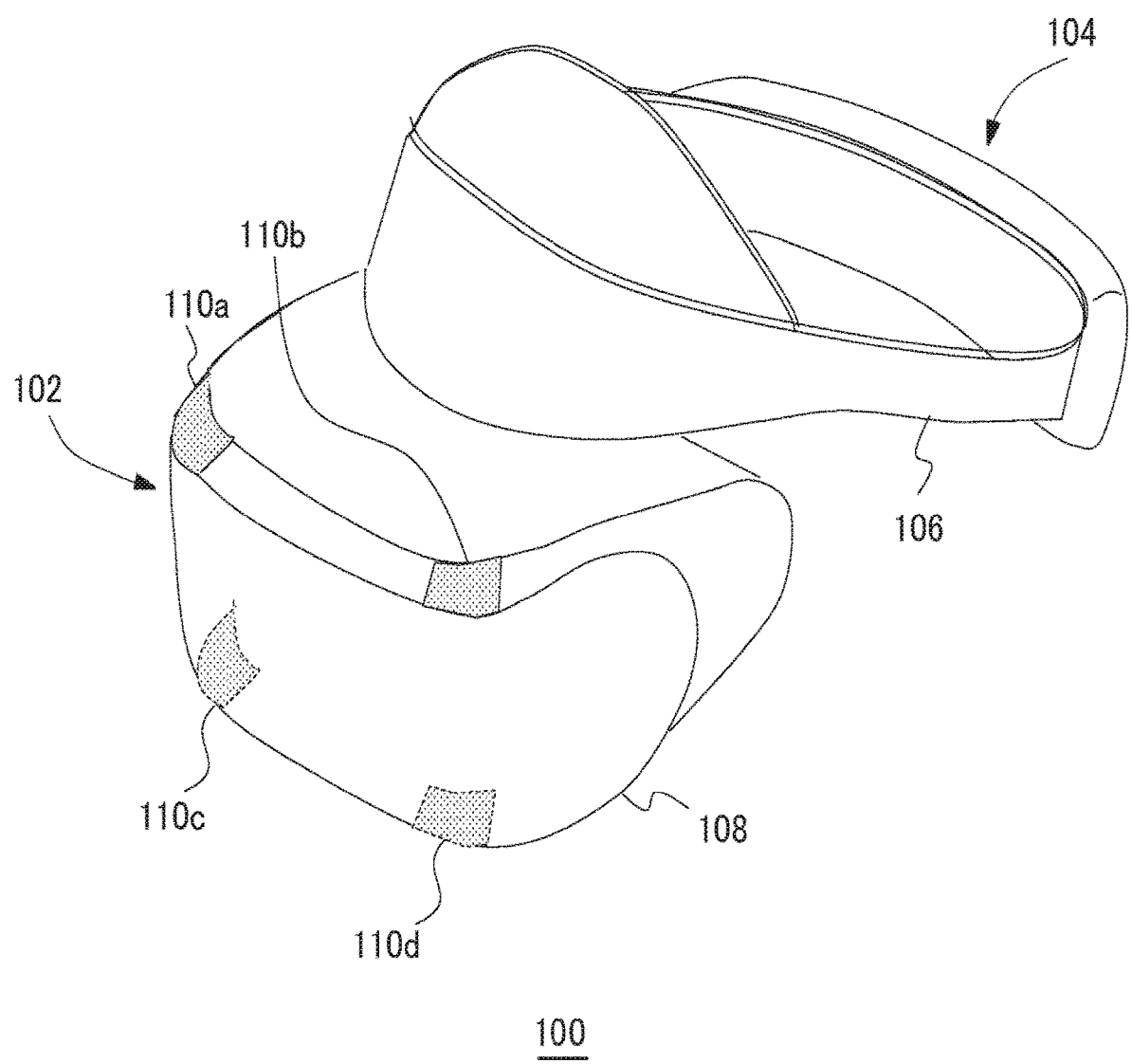
FIG. 2 is a view illustrating an example of an external shape of an HMD.

FIG. 2 illustrates an example of an external shape of the HMD 100. The HMD 100 includes an output mechanism section 102 and a wearing mechanism section 104. The wearing mechanism section 104 includes a wearing band 106. With the wearing band 106 worn by the user, the wearing band 106 surrounds the head so as to fix the HMD 100 to the head. The wearing band 106 is made of a material or has a structure that can be adjusted in length so as to match the head circumference of the user.

The output mechanism section 102 includes a housing 108. The housing 108 is shaped so as to cover the right and left eyes when the HMD 100 is worn by the user. The housing 108 includes, in its inside, the display panels, which directly face the eyes of the user wearing the HMD 100. The display panels may be liquid-crystal panels, organic electroluminescence (EL) panels, or the like. The housing 108 further includes, in its inside, a pair of right and left optical lenses that are positioned between the display panels and the user's eyes and enlarge the user's viewing angle. The HMD 100 may also include speakers or earphones at positions corresponding to the user's ears. The HMD 100 may be connected to external headphones.

The housing 108 includes, on its outer surface, light-emitting markers 110a, 110b, 110c, and 110d. Although, in this example, the tracking LEDs constitute the light-emitting markers 110, another type of markers may be used. That is, any type of markers can be used as long as the imaging apparatus 14 can capture the light-emitting markers 110 and the information processing apparatus 10 can analyze the positions of the markers in the captured image. Although there is no particular limitation on the number of light-emitting markers 110 and where they are disposed, the light-emitting markers 110 should be provided in sufficient number and disposed in appropriate positions to detect the posture of the HMD 100. In the example illustrated in FIG. 2, the light-emitting markers 110 are disposed at four corners of a front surface of the housing 108. The light-emitting markers 110 may also be disposed on side and rear portions of the wearing band 106 so that the imaging apparatus 14 can capture the light-emitting markers 110 even when the user's back faces the imaging apparatus 14.

The HMD 100 may be connected to the information processing apparatus 10 through a cable or a known wireless communication protocol. The HMD 100 not only transmits sensor data detected by the posture sensor and image data captured by an internal camera inside the housing 108 to the information processing apparatus 10 but also receives image data supplied from the information processing apparatus 10 and displays the images on the left-eye display panel and the right-eye display panel. The HMD 100 also receives sound data supplied from the information processing apparatus 10 and outputs the sound from the speakers.

Figure 3:
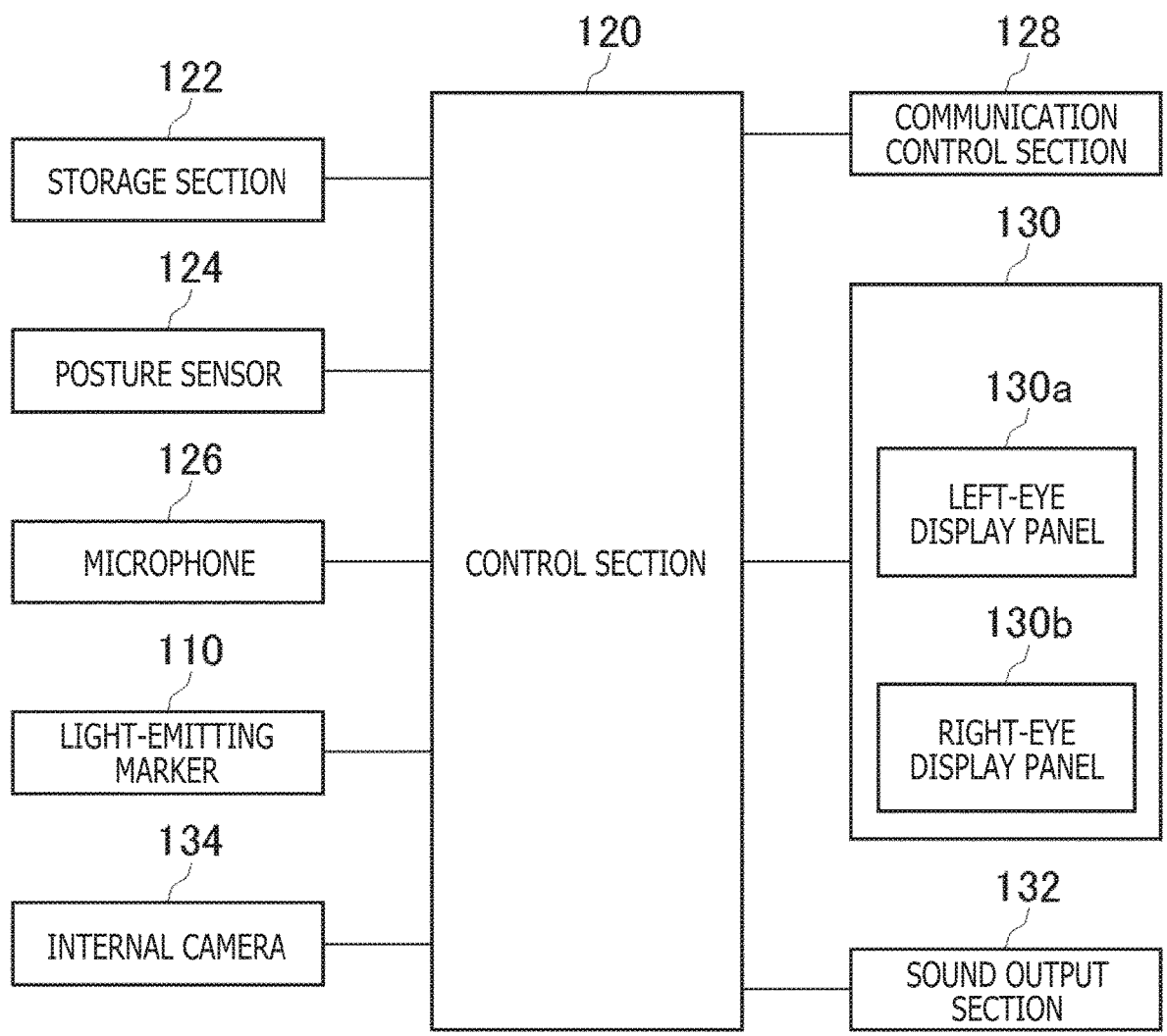
FIG. 3 is a diagram illustrating functional blocks of the HMD.

FIG. 3 illustrates functional blocks of the HMD 100. A control section 120 is a main processor that processes various kinds of data, such as image data, sound data, and sensor data, and instructions and outputs processing results. A storage section 122 temporarily stores, for example, data and instructions to be processed by the control section 120. A posture sensor 124 detects posture of the HMD 100 as posture information. The posture sensor 124 includes at least a three-axis acceleration sensor and a three-axis gyro sensor. An internal camera 134 is disposed inside the housing 108 and captures the user's eyes to track the user's gaze.

A communication control section 128 transmits data output from the control section 120, to the external information processing apparatus 10, through wired or wireless communication via a network adapter or an antenna. The communication control section 128 receives data from the information processing apparatus 10 through wired or wireless communication via the network adapter or the antenna and outputs the data to the control section 120.

The control section 120 supplies image data of content received from the information processing apparatus 10 to a display panel 130, causing the display panel 130 to display images. The control section 120 supplies sound data of the content received from the information processing apparatus 10 to a sound output section 132, causing the sound output section 132 to output the sound. The display panel 130 includes a left-eye display panel 130a and a right-eye display panel 130b on which a pair of parallax images is displayed. The control section 120 also causes the communication control section 128 to transmit sensor data supplied from the posture sensor 124, sound data supplied from a microphone 126, and captured image data supplied from the internal camera 134, to the information processing apparatus 10.

Figure 4:
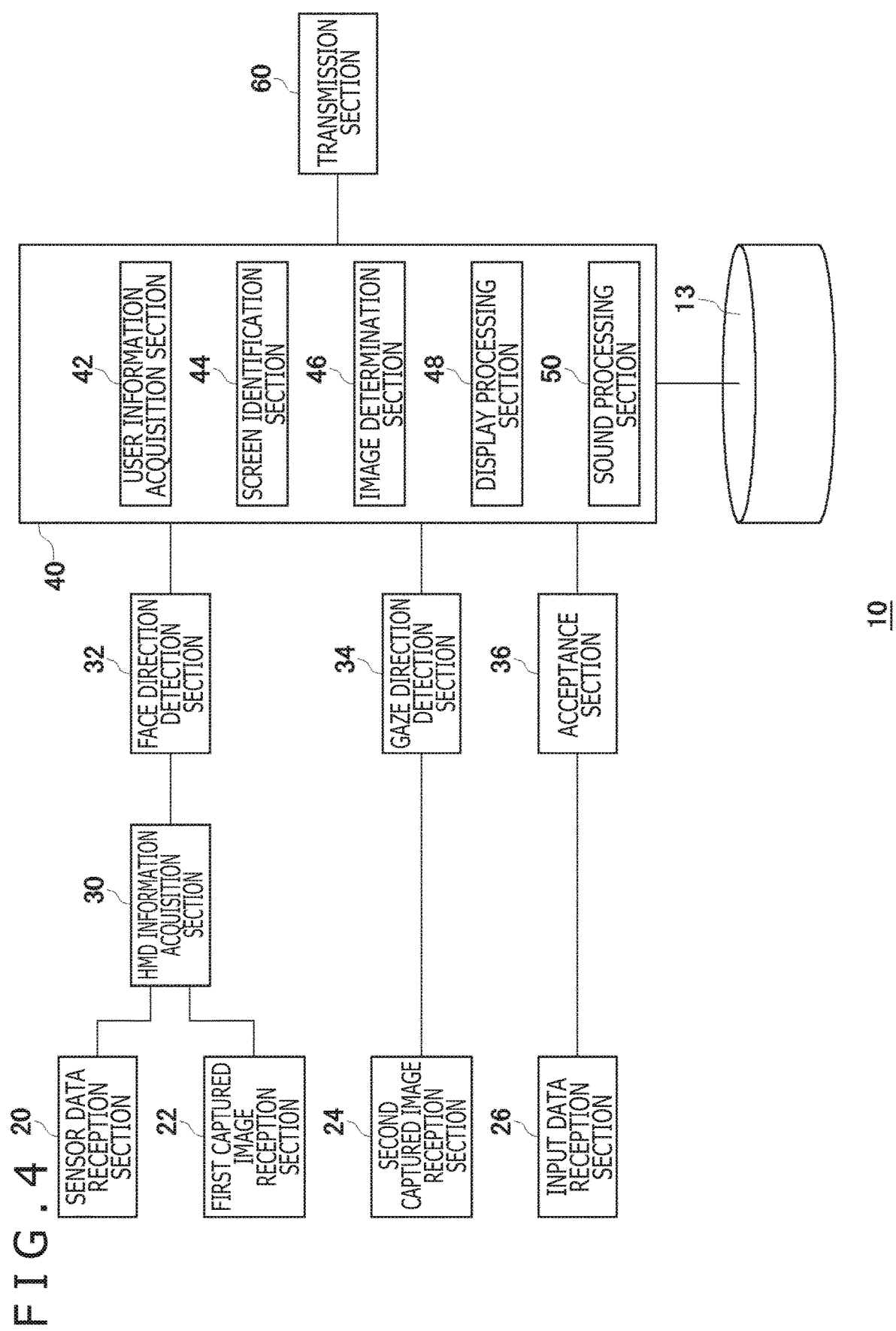
FIG. 4 is a diagram illustrating functional blocks of an information processing apparatus.

FIG. 4 illustrates functional blocks of the information processing apparatus 10. The information processing apparatus 10 includes, as input/output interfaces with the outside, a sensor data reception section 20, a first captured image reception section 22, a second captured image reception section 24, an input data reception section 26, and a transmission section 60. The information processing apparatus 10 further includes an HMD information acquisition section 30, a face direction detection section 32, a gaze direction detection section 34, an acceptance section 36, and an output processing section 40. The output processing section 40 includes a user information acquisition section 42, a screen identification section 44, an image determination section 46, a display processing section 48, and a sound processing section 50. The storage apparatus 13 stores a plurality of image materials (pieces of content) to be displayed on the HMD 100. Each content is associated with various kinds of metadata related to an image. For example, the metadata may include information indicating a category of the content and information indicating a person included in the content.

Each of the components described as the functional blocks performing various processes in FIG. 4 can be constituted by a circuit block, a memory, or another large-scale integrated circuit (LSI) in terms of hardware, and can be implemented by a program loaded in a memory or the like in terms of software. Thus, it is to be understood by those skilled in the art that these functional blocks can be implemented in various forms by hardware only, software only, or combinations of hardware and software, and are not limited to any of these forms.

Figure 5:
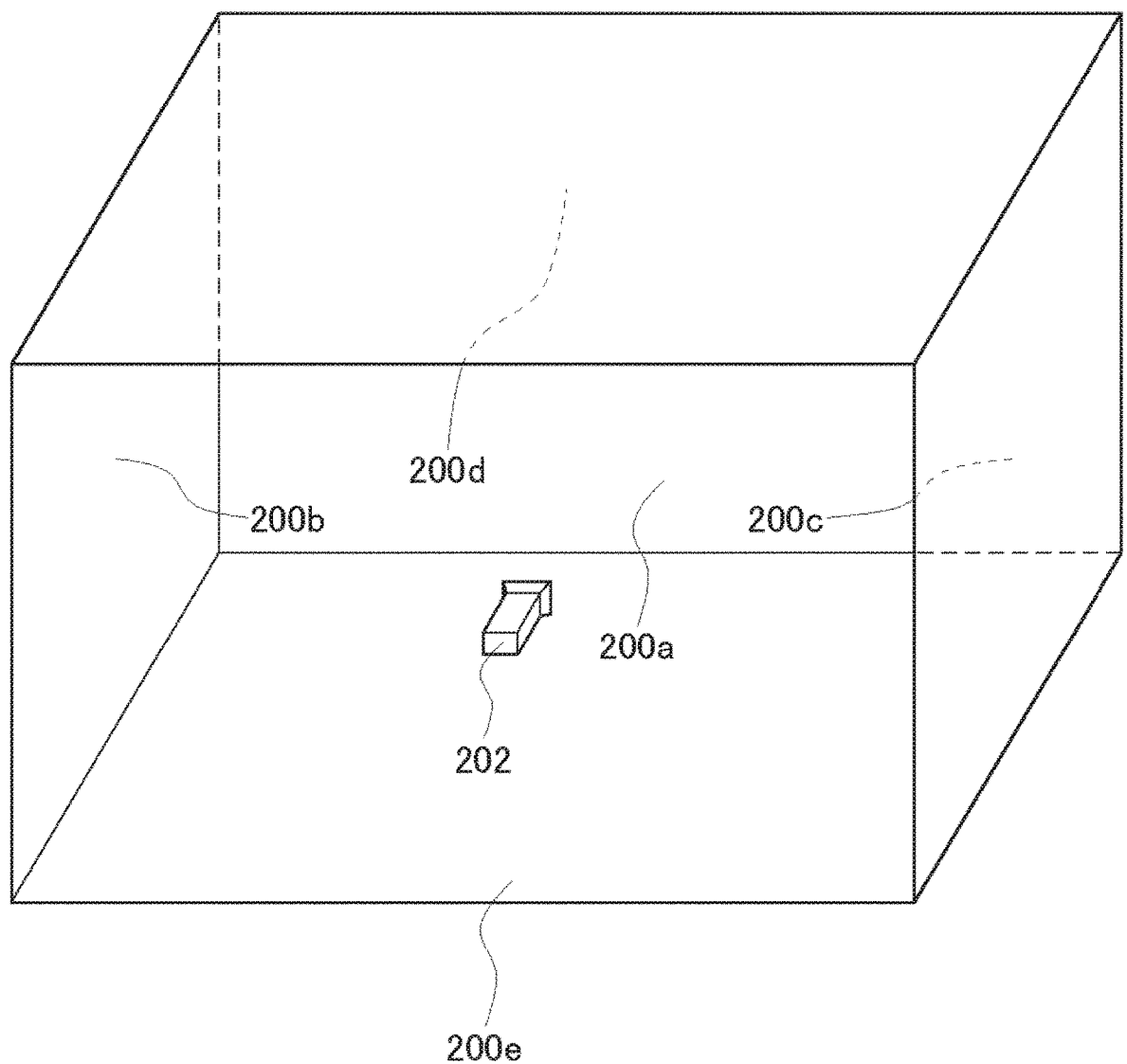
FIG. 5 is a view illustrating an example of a multi-screen environment.

FIG. 5 illustrates an example of a multi-screen environment set by the display processing section 48. The display processing section 48 sets a plurality of virtual screens 200 in a virtual three-dimensional space. The plurality of virtual screens 200 according to the present embodiment include a center screen 200a, a left-side screen 200b, a right-side screen 200c, an upper-side screen 200d, and a lower-side screen 200e. The five rectangular virtual screens 200 may constitute a pentahedron, forming an opened box with one of the six faces cut out. A display surface of each virtual screen 200 faces the inside of the pentahedron.

One side of the left-side screen 200b is connected to a left side of the center screen 200a. One side of the right-side screen 200c is connected to a right side of the center screen 200a. One side of the upper-side screen 200d is connected to an upper side of the center screen 200a. One side of the lower-side screen 200e is connected to a lower side of the center screen 200a. An upper side and a lower side of the left-side screen 200b are connected to one side of the upper-side screen 200d and one side of the lower-side screen 200e, respectively. An upper side and a lower side of the right-side screen 200c are connected to one side of the upper-side screen 200d and one side of the lower-side screen 200e, respectively.

A virtual camera 202, which serves as the user's viewpoint, is disposed at a predetermined position inside the pentahedron. Changing an optical axis direction of the virtual camera 202 changes a viewable image (field-of-view image). The plurality of virtual screens 200 each having a planar shape are connected to each other without any gaps therebetween, forming the pentahedron. This configuration can thus enhance the user's sense of immersion in the video. A back-side screen facing the center screen 200a may additionally be disposed to form a closed hexahedron.

Figure 6:
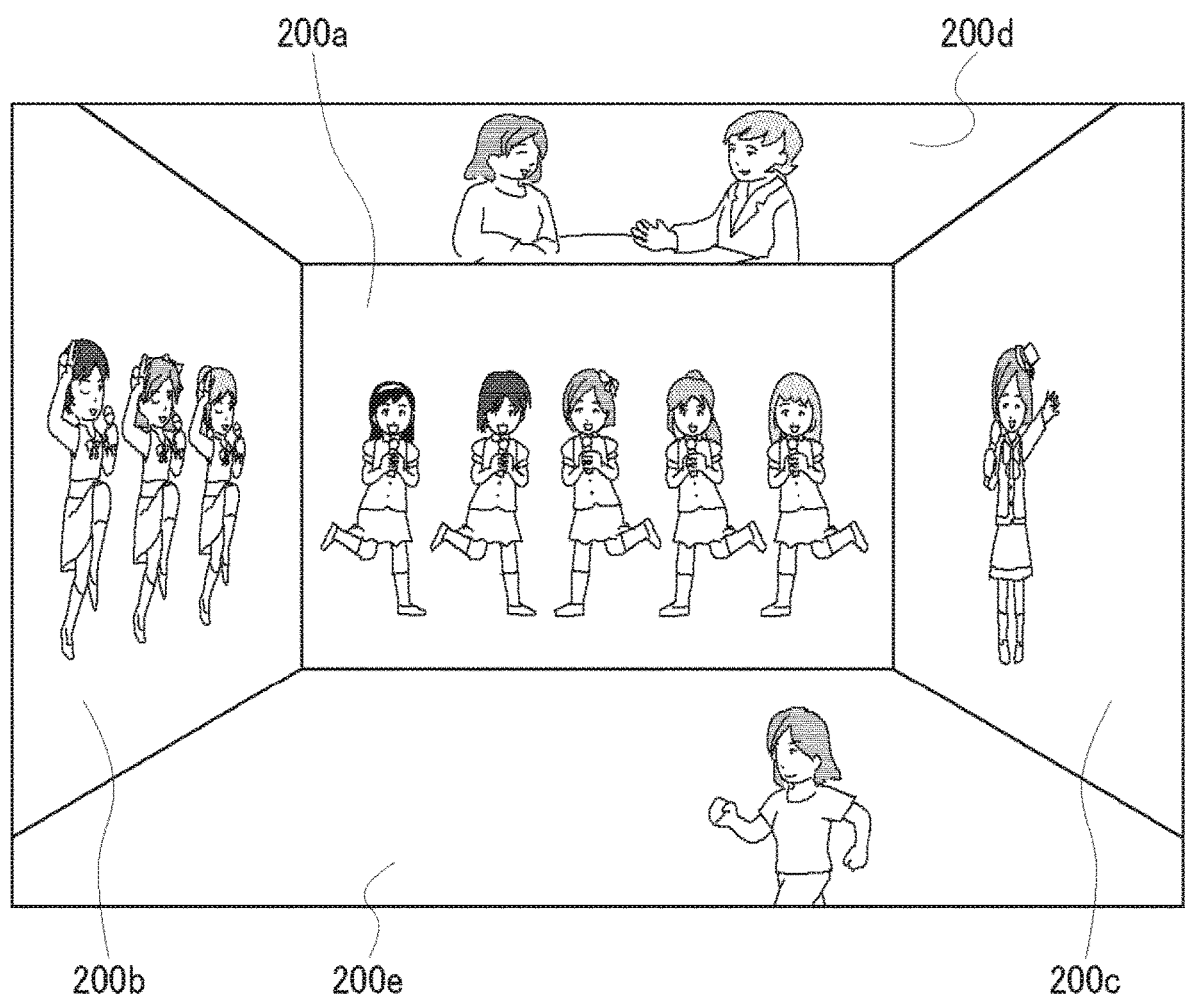
FIG. 6 is a view illustrating an example of multi-screen video displayed on the HMD.

FIG. 6 illustrates an example of multi-screen video displayed on the HMD 100. In this example, the user is facing front. Thus, an image displayed on the center screen 200a is visible in front of the user. In the multi-screen environment according to the present embodiment, an image based on at least one of a user preference and a user attribute is displayed on each screen. By displaying images that match at least one of the user preference and the user attribute, the information processing apparatus 10 can provide a new way of enjoying content. The details of how it works will be described below.

The sensor data reception section 20 receives sensor data at predetermined intervals from the posture sensor 124 of the HMD 100 worn by the user and supplies the sensor data to the HMD information acquisition section 30. The first captured image reception section 22 receives a captured image of the HMD 100 from the imaging apparatus 14 at predetermined intervals and supplies the captured image of the HMD 100 to the HMD information acquisition section 30. For example, the imaging apparatus 14 captures the space including the user every (1/60) seconds, and the first captured image reception section 22 receives the captured image every (1/60) seconds. In the present embodiment, the HMD information acquisition section 30 acquires the sensor data and the captured image as posture information indicating the posture of the HMD 100 worn on the user's head. The HMD information acquisition section 30 supplies the acquired posture information to the face direction detection section 32.

The face direction detection section 32 detects the orientation of the user's face according to the posture information of the HMD 100. Specifically, the face direction detection section 32 detects a change in the posture of the HMD 100 from the sensor data of the posture sensor 124. At this time, the face direction detection section 32 may identify a change in the posture of the HMD 100 from the sensor data of the three-axis gyro sensor. In order to increase the accuracy of detecting a change in the posture, it is preferred that the face direction detection section 32 further use the captured image of the light-emitting markers 110 used for tracking. The face direction detection section 32 determines the identified posture of the HMD 100 as the orientation of the user's face and supplies the orientation of the user's face to the display processing section 48.

The second captured image reception section 24 receives a captured image of the user's eyes from the internal camera 134 at predetermined intervals and supplies the captured image of the user's eyes to the gaze direction detection section 34. For example, the internal camera 134 irradiates the user's right and left eyes with infrared light and captures the reflected light. The gaze direction detection section 34 detects the user's gaze direction by detecting the rotation angles of eyeballs of the right and left eyes from the captured image of the reflected light. The gaze direction detection section 34 may detect the user's gaze direction by using another known eye tracking function. The gaze direction detection section 34 supplies the detected gaze direction to the user information acquisition section 42 and the screen identification section 44.

The input data reception section 26 receives operation information input by the user from the input apparatus 16 and supplies the operation information to the acceptance section 36. The acceptance section 36 supplies the operation information to the output processing section 40. The user may input the operation information from the input apparatus 16 when starting the content video display application or when selecting content to be displayed on the center screen 200a.

In the output processing section 40, the display processing section 48 uses the orientation of the face supplied from the face direction detection section 32, as information for determining the optical axis direction of the virtual camera 202 in the virtual space. The display processing section 48 may also use the operation information supplied from the acceptance section 36, as information for determining the optical axis direction of the virtual camera 202. Although, in the present embodiment, the position of the virtual camera 202 in the virtual space is fixed, the virtual camera 202 may be movable in the virtual space. In this case, the display processing section 48 may use the operation information supplied from the acceptance section 36, as information for moving the position where the virtual camera 202 is disposed.

The display processing section 48 generates a display image (field-of-view image) corresponding to the position and optical axis direction of the virtual camera 202. Specifically, when the display processing section 48 generates a display image for the left eye and a display image for the right eye, the transmission section 60 transmits the display image for the left eye and the display image for the right eye to the HMD 100, and the HMD 100 displays the display image for the left eye and display image for the right eye on the display panel 130. Accordingly, the user can view images displayed on the five virtual screens 200. FIG. 6 illustrates images displayed when the user faces the center screen 200a. When the user turns 90 degrees to the left, the optical axis direction of the virtual camera 202 turns 90 degrees to the left. Thus, the left-side screen 200b comes to the front of the user.

An image to be displayed on each virtual screen 200 will be described below. In the present embodiment, the user selects a content image to be displayed on the center screen 200a, and the image determination section 46 determines content images to be displayed on the other virtual screens 200 according to user information indicating at least one of the user preference and the user attribute. In this example, the user determines to display video of a pop star group's concert on the center screen 200a. Alternatively, a content image to be displayed on the center screen 200a may be selected by the image determination section 46 or determined in advance.

The user information acquisition section 42 acquires the user information indicating at least one of the user preference and the user attribute. The user information acquisition section 42 may acquire, via the network 2, the user information indicating at least one of the user preference and the user attribute from an external server that manages the user information. To display the video of the pop star group's concert, the user information acquisition section 42 acquires, from the external server, at least user information regarding the pop star group, such as information indicating the user's favorite member of the pop star group. Moreover, the user information acquisition section 42 may acquire attribute information from the external server. The attribute information includes, for example, the user's gender, age, hometown, hobbies, and category in which the user is highly interested.

After the content image is displayed, the user information acquisition section 42 may identify the member who draws the user's interest, in real time, on the basis of the result of measurement of the user's gaze (eye tracking). In this case, the user information acquisition section 42 acquires the user's gaze direction from the gaze direction detection section 34 and acquires information indicating which object (member) is being viewed by the user, on the basis of a field-of-view image displayed at that time. If it is detected that the user is gazing at the member A of the pop star group, the user information acquisition section 42 may acquire user information indicating that the user likes the member A. In this manner, the user information acquisition section 42 may acquire the user information indicating at least one of the user preference and the user attribute.

The image determination section 46 determines images to be displayed on the virtual screens 200 other than the center screen 200a, according to at least one of the user preference and the user attribute. For example, if the user's favorite is the member A, the image determination section 46 searches the storage apparatus 13 for pieces of content related to the member A. The storage apparatus 13 stores pieces of content associated with various kinds of metadata.

The image determination section 46 has a function of evaluating a plurality of pieces of content stored in the storage apparatus 13, on the basis of at least one of the user preference and the user attribute, by referring to the metadata. In this example, the image determination section 46 searches the storage apparatus 13 for pieces of content associated with the member A as the metadata and calculates an evaluation value of each content. As described later, the image determination section 46 may search for content that does not include the member A as the metadata. The image determination section 46 calculates the evaluation value according to a predetermined evaluation criterion.

In the present embodiment, the image determination section 46 calculates the degree of relevance to the user information and the content to be displayed on the center screen 200a, as the evaluation value. Specifically, when content has a high degree of relevance to the user information and the image material to be displayed on the center screen 200a, the evaluation value of the content calculated by the image determination section 46 is high. When content has a low degree of relevance to the user information and the image material to be displayed on the center screen 200a, the evaluation value of the content calculated by the image determination section 46 is low.

For example, the image determination section 46 gives a first reference point to content that includes the member A in the metadata and belongs to the same category as the image material to be displayed on the center screen 200a. Meanwhile, the image determination section 46 gives a second reference point, which is lower than the first reference point, to content that includes the member A in the metadata but belongs to a different category. For example, assume that each content is evaluated on a 100-point scale. In this case, the image determination section 46 gives 70 points (the first reference point) to content that includes the member A in the metadata and belongs to a material category "concert video," while giving 40 points (the second reference point) to content that includes the member A in the metadata but belongs to a material category other than the material category "concert video." A reference point of 0 may be given to content that does not include the member A in the metadata. The image determination section 46 calculates the evaluation value of the content by further adding, as the evaluation value, the degree of relevance between at least one of the user preference other than the user's favorite member and the user attribute and the metadata of the content to the reference point.

The image determination section 46 determines to display images with relatively high evaluation values on the left-side screen 200b and the right-side screen 200c while determining to display images with relatively low evaluation values on the upper-side screen 200d and the lower-side screen 200e. An image (field-of-view image) displayed on the display panel 130 has a horizontally long rectangular shape so as to secure a large display space in the horizontal direction. Thus, displaying images with high evaluation values on the left-side screen 200b and the right-side screen 200c can display content images that match at least one of the user preference and the user attribute.

The image determination section 46 may select pieces of content to be displayed on the left-side screen 200b and the right-side screen 200c from pieces of content with evaluation values higher than a predetermined threshold value (e.g., 60 points), while selecting pieces of content to be displayed on the upper-side screen 200d and the lower-side screen 200e from pieces of contents with evaluation values equal to or less than the predetermined threshold value (e.g., 60 points). The predetermined threshold value is set lower than the first reference point (70 points). This increases the likelihood that pieces of content of categories different from the category of the image material on the center screen 200a are displayed on the upper-side screen 200d and the lower-side screen 200e.

If concert video is displayed on the center screen 200a, as described above, pieces of video having high degrees of relevance to the image material on the center screen 200a are displayed on the left-side screen 200b and the right-side screen 200c. Thus, pieces of video to be selected for the left-side screen 200b and the right-side screen 200c are highly likely to be concert video as with the center screen 200a. In this case, further displaying concert video on the upper-side screen 200d and the lower-side screen 200e is expected to be regarded as slightly dull since similar pieces of video are displayed on the five screens. Thus, the image determination section 46 may determine images with evaluation values lower than the predetermined reference as images to be displayed on the upper-side screen 200d and the lower-side screen 200e. Alternatively, regardless of the evaluation values, the image determination section 46 may determine images of categories different from the category of the image to be displayed on the center screen 200a as images to be displayed on the upper-side screen 200d and the lower-side screen 200e.

As a result of the above-described determination processing performed by the image determination section 46, the following images are displayed on the respective virtual screens 200 illustrated in FIG. 6.

—Center Screen 200a

Concert video selected by the user is displayed. When the user selects a single piece of content from the storage apparatus 13, the image determination section 46 determines the selected content as an image material to be displayed on the center screen 200a.

The image determination section 46 determines pieces of content to be displayed on the left-side screen 200b, the right-side screen 200c, the upper-side screen 200d, and the lower-side screen 200e according to at least one of the user preference and the user attribute. Specifically, the image determination section 46 calculates the evaluation values of the pieces of content stored in the storage apparatus 13. Then, the image determination section 46 determines to display pieces of content with relatively high evaluation values on the left-side screen 200b and the right-side screen 200c, while determining to display pieces of content with relatively low evaluation values on the upper-side screen 200d and the lower-side screen 200e.

—Left-Side Screen 200b and Right-Side Screen 200c

As with the image material for the center screen 200a in which the member A participates in a concert, the image determination section 46 determines to display video of concerts in which the member A participates on the left-side screen 200b and the right-side screen 200c. The concerts of the pieces of video to be displayed on the left-side screen 200b and the right-side screen 200c are not required to be the concerts held on the same day as the concert of the video to be displayed on the center screen 200a and may be different therefrom. In other words, the concerts of the pieces of video to be displayed on the center screen 200a, the left-side screen 200b, and the right-side screen 200c may all be different from each other.

—Upper-Side Screen 200d and Lower-Side Screen 200e

The image determination section 46 determines to display pieces of video other than concert video on the upper-side screen 200d and the lower-side screen 200e. In this example, the image determination section 46 determines to display interview video of the member A on the upper-side screen 200d and video of the member A exercising to build strength on the lower-side screen 200e. Since neither of the pieces of content is concert video, their evaluation values are relatively low, but both include at least the video of the member A.

In this manner, the image determination section 46 determines the image materials to be displayed on the five virtual screens 200. The display processing section 48 transmits the image data of each of the pieces of content determined by the image determination section 46 from the transmission section 60 to the HMD 100, causing the virtual screens 200 of the display panel 130 to display the respective images. Specifically, in the HMD 100, the control section 120 acquires the image data to be displayed on each virtual screen 200 and displays the images on the display panel 130. With this configuration, the user can view multi-screen video that matches the user preference.

The sound processing section 50 causes the sound output section 132 to output a sound corresponding to at least one of the images displayed on the plurality of virtual screens 200. In the present embodiment, the sound processing section 50 causes the sound output section 132 to output a sound corresponding to the image displayed on the center screen 200a. Since the image selected by the user is displayed on the center screen 200a, the sound processing section 50 causes the sound output section 132 to output a sound corresponding to the image displayed on the center screen 200a. Accordingly, the sound is output in conjunction with the image displayed on the center screen 200a.

In the multi-screen environment, the user can view any of the images displayed on the virtual screens 200 other than the center screen 200a. In this case, the output sound may not be changed or may be changed in response to a change of the virtual screen 200 being viewed by the user. In the latter case, the sound processing section 50 may cause the sound output section 132 to output a sound corresponding to the image displayed on the virtual screen 200 being viewed by the user.

For this purpose, the screen identification section 44 identifies the virtual screen 200 being viewed by the user, on the basis of the user's gaze direction detected by the gaze direction detection section 34. The screen identification section 44 may identify the virtual screen 200 being viewed by the user, by intersecting the gaze direction originating from the virtual camera 202 with the field-of-view image displayed on the display panel 130. The sound processing section 50 reads, from the storage apparatus 13, a sound corresponding to an image displayed on the virtual screen 200 identified by the screen identification section 44 and transmits the sound from the transmission section 60 to the HMD 100. In the HMD 100, the control section 120 acquires the sound data and outputs the sound from the sound output section 132. With this configuration, the user can listen to the sound that is output in conjunction with the image being viewed by the user.

In an actual multi-screen environment, the user normally moves the user's gaze from place to place. Accordingly, the display image being viewed by the user is frequently switched. However, if sound is switched each time the display image being viewed by the user is switched, there is a possibility that an undesirable issue arises. Thus, the screen identification section 44 may measure a duration of time the user is continuously viewing one virtual screen 200, and in response to the measured duration of time exceeding a predetermined time period, the sound processing section 50 may cause the sound output section 132 to output a sound corresponding to the image displayed on the relevant virtual screen 200. In this example, the screen identification section 44 determines whether the user is gazing at one virtual screen 200 by measuring the duration of time the user is continuously viewing the virtual screen 200. For example, the predetermined time period may be set in the range of 5 to 10 seconds. For example, assume that the user gains an interest in the interview video displayed on the upper-side screen 200d while viewing the concert video displayed on the center screen 200a, and then shifts the gaze direction slightly upward. In this case, if the user continuously views the video displayed on the upper-side screen 200d for the predetermined time period or longer, the sound output section 132 outputs an interview sound instead of the concert sound.

The present disclosure has been described above on the basis of the embodiment. The above-described embodiment is an exemplification, and it is to be understood by those skilled in the art that various modifications can be made to combinations of each constituent component and each processing process in the embodiment and that such modifications also fall within the scope of the present disclosure.

In the embodiment described above, the information processing apparatus 10 and the HMD 100 are separate apparatuses. In a modification, the functions of the information processing apparatus 10 may be incorporated into the HMD 100, and the HMD 100 may implement the image display function by itself.

In the embodiment described above, the user information acquisition section 42 acquires the user's gaze direction from the gaze direction detection section 34 and identifies which object is being gazed at by the user, on the basis of the field-of-view image displayed at that time, to acquire user information indicating a preference identified on the basis of the object. If there is any change of the object identified by the user information acquisition section 42, the image determination section 46 may change content on the basis of the changed object. Note that the user information acquisition section 42 may acquire the user information indicating at least one of the user preference and the user attribute directly input by the user operating the input apparatus 16. In this case, since the user directly inputs the user preference information and the like, the user information acquisition section 42 can acquire the user preference information in a more reliable manner.

In the embodiment described above, the output processing section 40 acquires image data and sound data of content from the storage apparatus 13. Alternatively, the output processing section 40 may acquire image data and sound data from an external content server. In this case, the image determination section 46 may calculate the evaluation values of pieces of content stored in the external content server.

In the embodiment described above, the image determination section 46 determines content on the basis of the user preference information. Alternatively, the image determination section 46 may determine content on the basis of the user attribute information. In particular, if the user does not select content but the image determination section 46 selects content to be displayed on each of all the virtual screens 200, the image determination section 46 may determine content to be displayed on the center screen 200a on the basis of the user attribute information and determine pieces of content to be displayed on the other virtual screens 200 on the basis of this content and the user information.

In the embodiment described above, the image determination section 46 extracts content that includes the member A as the metadata. Alternatively, the image determination section 46 may search for content that does not include the member A. In this case, for example, the image determination section 46 may extract content that includes member information associated with the member A, for example, a member who is close to the member A as the metadata and determine this content as the content to be displayed on the virtual screen 200. Moreover, the image determination section 46 may provide the user with content that has been provided to another user whose at least one of the user preference and the user attribute is similar to that of the user.

What is claimed is:

1. An information processing apparatus for causing a plurality of virtual screens to display images, comprising:
 a user information acquisition section configured to acquire user information indicating at least one of a user preference and a user attribute;
 an image determination section configured to determine images to be displayed on the respective virtual screens according to the user information; and
 a display processing section configured to cause the virtual screens to display the respective images determined by the image determination section, wherein:
 for each candidate content to be displayed, an evaluation value is calculated on a basis of the user information, and
 the image determination section determines to display pieces of content with relatively high evaluation values on the left-side screen and the right-side screen, while determining to display pieces of content with relatively low evaluation values on the upper-side screen and the lower-side screen.

2. The information processing apparatus according to claim 1, further comprising: a sound processing section configured to cause a sound output section to output a sound corresponding to at least one of the images displayed.

3. The information processing apparatus according to claim 2, wherein
at least a virtual center screen, a virtual left-side screen, a virtual right-side screen, a virtual upper-side screen, and a virtual lower-side screen are set in a virtual space, and
the sound processing section causes the sound output section to output a sound corresponding to an image displayed on the center screen.

4. The information processing apparatus according to claim 2, further comprising:
an identification section configured to identify a virtual screen being viewed by a user among the plurality of virtual screens,
wherein the sound processing section causes the sound output section to output a sound corresponding to an image displayed on the virtual screen being viewed by the user.

5. The information processing apparatus according to claim 4, wherein the identification section measures a duration of time the user is continuously viewing one virtual screen among the plurality of virtual screens, and in response to the measured duration of time exceeding a predetermined time period, the sound processing section causes the sound output section to output a sound corresponding to an image displayed on the virtual screen being viewed by the user.

6. The information processing apparatus according to claim 1, wherein the user information acquisition section acquires information indicating which object in one of the images displayed is being viewed by a user.

7. An image display method for causing a plurality of virtual screens to display images, comprising:
acquiring user information indicating at least one of a user preference and a user attribute;
determining images to be displayed on the respective virtual screens according to the user information; and
causing the virtual screens to display the respective determined images, wherein:
for each candidate content to be displayed, an evaluation value is calculated on a basis of the user information, and
the image determination section determines to display pieces of content with relatively high evaluation values on the left-side screen and the right-side screen, while determining to display pieces of content with relatively low evaluation values on the upper-side screen and the lower-side screen.

8. A non-transitory, computer readable storage medium containing a computer program, which when executed by a computer, instructs the computer to perform an image display method for causing a plurality of virtual screens to display images, by carrying out actions, comprising:
acquiring user information indicating at least one of a user preference and a user attribute;
determining images to be displayed on the respective virtual screens according to the user information; and
causing the virtual screens to display the respective determined images, wherein:
for each candidate content to be displayed, an evaluation value is calculated on a basis of the user information, and
the image determination section determines to display pieces of content with relatively high evaluation values on the left-side screen and the right-side screen, while determining to display pieces of content with relatively low evaluation values on the upper-side screen and the lower-side screen.

* * * * *